US012326239B2

(12) United States Patent
Chai et al.

(10) Patent No.: US 12,326,239 B2
(45) Date of Patent: Jun. 10, 2025

(54) LIGHT EMITTING MODULE AND CAR LAMP

(71) Applicants: Chengdu BOE Optoelectronics Technology Co., Ltd., Sichuan (CN); BOE Technology Group Co., Ltd., Beijing (CN)

(72) Inventors: Yuanyuan Chai, Beijing (CN); Shangnan Jin, Beijing (CN); Xuan Tao, Beijing (CN); Bowen Xiao, Beijing (CN); Binfeng Feng, Beijing (CN); Fei Li, Beijing (CN); Jiming Zhang, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/694,658

(22) PCT Filed: Jul. 31, 2023

(86) PCT No.: PCT/CN2023/110364

§ 371 (c)(1),
(2) Date: Mar. 22, 2024

(87) PCT Pub. No.: WO2024/060843

PCT Pub. Date: Mar. 28, 2024

(65) Prior Publication Data

US 2025/0067420 A1 Feb. 27, 2025

(30) Foreign Application Priority Data

Sep. 19, 2022 (CN) ........................ 202211138200.4

(51) Int. Cl.
*F21S 41/155* (2018.01)
*F21S 41/20* (2018.01)
(Continued)

(52) U.S. Cl.
CPC ........ *F21V 19/0015* (2013.01); *F21S 41/155* (2018.01); *F21S 41/20* (2018.01); *F21Y 2115/15* (2016.08)

(58) Field of Classification Search
CPC .................................................. F21V 19/0015
See application file for complete search history.

(56) References Cited

U.S. PATENT DOCUMENTS

| | | | | |
|---|---|---|---|---|
| 6,299,337 | B1 * | 10/2001 | Bachl | G09F 9/301 362/545 |
| 11,168,862 | B2 * | 11/2021 | Crompvoets | F21S 43/195 |

(Continued)

FOREIGN PATENT DOCUMENTS

| | | |
|---|---|---|
| CN | 112639353 A | 4/2021 |
| CN | 115394940 A | 11/2022 |

(Continued)

*Primary Examiner* — Zheng Song
(74) *Attorney, Agent, or Firm* — WHDA, LLP

(57) ABSTRACT

A light emitting module and a car lamp are provided. The light emitting module includes a flexible light emitting panel (10) and a support (20) disposed at the shadow side of the flexible light emitting panel (10). The surface of the side of the support (20) close to the flexible light emitting panel (10) includes a plurality of sub-surfaces (201), and the plurality of sub-surfaces (201) are sequentially connected to form an integral step-shaped structure.

15 Claims, 4 Drawing Sheets

(51) Int. Cl.

| | |
|---|---|
| ***F21V 19/00*** | (2006.01) |
| *F21Y 115/15* | (2016.01) |

(56) References Cited

U.S. PATENT DOCUMENTS

| | | | | |
|---|---|---|---|---|
| 2003/0147253 | A1* | 8/2003 | Shy | B60Q 1/28 362/540 |
| 2006/0092658 | A1* | 5/2006 | Scholz | B60Q 1/263 362/540 |
| 2008/0093110 | A1* | 4/2008 | Bagung | H05K 1/0278 174/254 |
| 2009/0104804 | A1* | 4/2009 | Lin | F21K 9/00 439/211 |
| 2011/0228536 | A1* | 9/2011 | Im | F21S 41/192 362/249.06 |
| 2013/0049570 | A1 | 2/2013 | Natsume | |
| 2014/0063805 | A1* | 3/2014 | Song | F21S 43/195 362/382 |
| 2016/0178151 | A1* | 6/2016 | Maitre | F21S 43/195 362/545 |
| 2017/0045190 | A1* | 2/2017 | Song | F21S 41/151 |
| 2017/0254518 | A1* | 9/2017 | Vasylyev | F21V 19/003 |
| 2018/0119932 | A1* | 5/2018 | Yeh | G02F 1/133603 |
| 2019/0217768 | A1 | 7/2019 | Yoon et al. | |
| 2021/0321509 | A1* | 10/2021 | Jung | H05K 1/028 |
| 2022/0164564 | A1 | 5/2022 | Wu et al. | |

FOREIGN PATENT DOCUMENTS

| | | | |
|---|---|---|---|
| EP | 3845797 | A1 | 7/2021 |
| JP | 2018-073660 | A | 5/2018 |

* cited by examiner

LIGHT EMITTING MODULE AND CAR LAMP

CROSS REFERENCE TO RELEVANT APPLICATIONS

The present disclosure claims the priority of the Chinese patent application filed on Sep. 19, 2022 before the Chinese Patent Office with the application number of 202211138200.4 and the title of "LIGHT EMITTING MODULE AND CAR LAMP", which is incorporated herein in its entirety by reference.

TECHNICAL FIELD

The present disclosure relates to the technical field of displaying and, more particularly, to a light emitting module and a car lamp.

BACKGROUND

Organic electroluminescence displays (OLED) are current-type organic light emitting devices, and are a phenomenon of luminescence caused by the injection and recombination of charge carriers, wherein the luminous intensity is in direct proportion to the injected electric current. In the OLED, by the effect of an electric field, the holes generated by the anode and the electrons generated by the cathode move, are injected into the hole transporting layer and the electron transporting layer respectively, and migrate to the light emitting layer. When the holes and the electrons meet at the light emitting layer, energy excitons are generated, thereby luminescent molecules are excited to finally generate a visible light. OLED car lamps, based on their characteristic of face light emission and characteristic of segmented displaying, have become an inexorable trend of OLED illumination in future.

SUMMARY

According to the first aspect of the present disclosure, there is provided a light emitting module, wherein the light emitting module includes:

- a flexible light emitting panel and a support disposed at a shadow side of the flexible light emitting panel;
- wherein a surface of one side of the support close to the flexible light emitting panel includes a plurality of sub-surfaces, and the plurality of sub-surfaces are sequentially connected to form an integral step-shaped structure.

Optionally, a quantity of steps included by the step-shaped structure is greater than or equal to 3.

Optionally, two neighboring sub-surfaces are connected to form a single step of the step-shaped structure, an included angle of the single step is a first included angle, and an included angle between two neighboring single steps is a second included angle;

- an opening of the first included angle faces one side away from the flexible light emitting panel, an opening of the second included angle faces one side where the flexible light emitting panel is located, and the first included angle and the second included angle are alternately arranged;
- wherein an angle of the first included angle is greater than 180 degrees, and less than 270 degrees; and
- an angle of the second included angle is greater than 90 degrees, and less than 180 degrees.

Optionally, the flexible light emitting panel includes: a substrate, a light emitting layer disposed at one side of the substrate and a packaging layer disposed at one side of the light emitting layer away from the substrate;

- wherein the packaging layer is closest to the support.

Optionally, the flexible light emitting panel further includes: a light filtering film disposed at one side of the substrate away from the light emitting layer.

Optionally, the flexible light emitting panel further includes: a flexible circuit board, wherein one side of the flexible circuit board is connected to the light emitting layer, and the other side of the flexible circuit board is bent to one side of the support away from the flexible light emitting panel.

Optionally, the light emitting module further includes: a decorating support disposed at one side of the flexible light emitting panel away from the support; and the decorating support includes an extending section, and an orthographic projection of

- the extending section on the support does not overlap with an orthographic projection of the flexible light emitting panel on the support.

Optionally, a bending length of the flexible circuit board is less than a length in a first direction of the extending section;

- wherein the bending length refers to a length in the first direction of a part of the flexible circuit board that goes beyond the flexible light emitting panel; and
- the first direction refers to a direction parallel to a surface of the support.

Optionally, the light filtering film completely covers the substrate, and the decorating support is located at one side of the light filtering film away from the substrate.

Optionally, the light filtering film partially covers the substrate, and the decorating support is located at one side of the substrate not covered by the light filtering film away from the light emitting layer.

Optionally, the extending section is bent to the one side of the support away from the flexible light emitting panel;

- the support includes a fitting part, the fitting part is provided with a fitting hole, and the extending section, after bent, adheres to the fitting part; and
- the extending section is provided with a snap-fitting part, and the snap-fitting part passes through the fitting hole, whereby the extending section is stuck with the fitting part.

Optionally, the support is provided with a via hole, and the flexible circuit board, after bent, passes through the via hole.

Optionally, the light emitting module further includes: a control panel, wherein one side of the flexible circuit board that is further from the light emitting layer is connected to the control panel.

Optionally, a material of the support includes at least one of an aluminum alloy, polymethyl methacrylate (PMMA) and acrylonitrile-butadiene-styrene copolymer (ABS).

According to the second aspect of the present disclosure, a car lamp is provided, wherein the car lamp includes the light emitting module according to the first aspect of the present disclosure.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the related art, all of the OLED car lamps are of an independent structure, an entire vehicle usually includes a plurality of OLED car lamps, which are arranged in different forms, and the multiform displaying of the car lamps is formed mainly by the arrangements of the plurality of different OLED car lamps on the entire vehicle. An OLED car lamp usually includes a light emitting panel and a support. The light emitting panel is usually a rigid OLED, and the support is used to support the light emitting panel, and is connected to the related modules of the vehicle. However, the supports of the rigid OLED car lamp modules are required to be designed according to the different shapes of the car lamps, which causes that the supports have a great variety of designs and a high cost, and there is a risk in interference between the supports of the different car lamps.

In view of the above, a light emitting module and a car lamp are provided by the present disclosure, wherein the light emitting module includes a flexible light emitting panel and a support located at the shadow side of the flexible light emitting panel. The surface of the side of the support close to the flexible light emitting panel includes a plurality of sub-surfaces, and the plurality of sub-surfaces are sequentially connected to form an integral step-shaped structure. By using the flexible light emitting panel, the shape of the light emitting module can be configured to be of a step shape, and the support is of an integral step-shaped structure, whereby it is not required to design different supports for different car lamps, which reduces the cost, and prevents interference between the supports of the different car lamps.

In order to make the above purposes, features and advantages of the present disclosure more apparent and understandable, the cover plate, the displaying module and the displaying device according to the present disclosure will be described in further detail below with reference to the drawings and the particular embodiments in the present disclosure.

Figure 1:
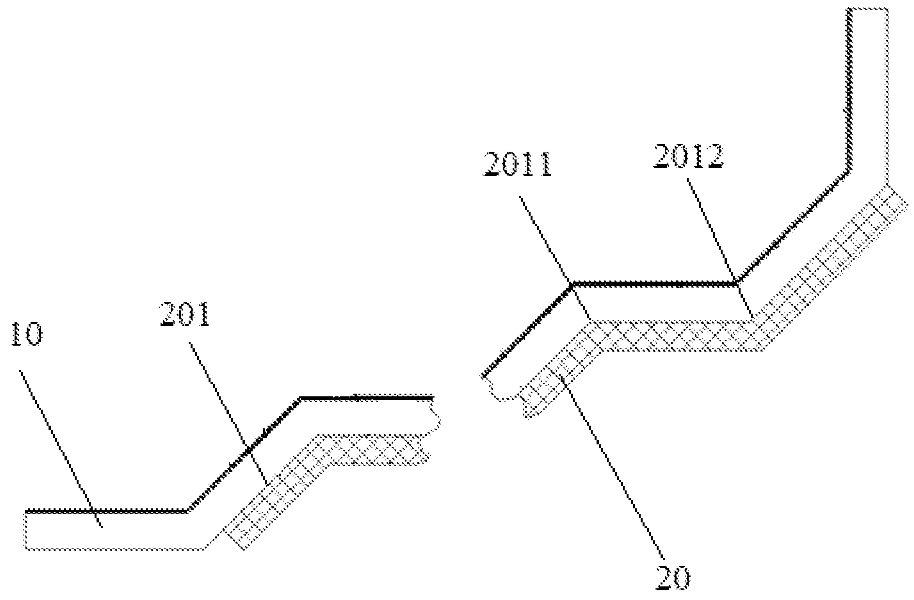
FIG. 1 shows a schematic structural diagram of a light emitting module according to an embodiment of the present disclosure.

Referring to FIG. 1, FIG. 1 is a light emitting module according to the present disclosure. The light emitting module includes a flexible light emitting panel 10 and a support 20 disposed at the shadow side of the flexible light emitting panel 10.

Figure 2:
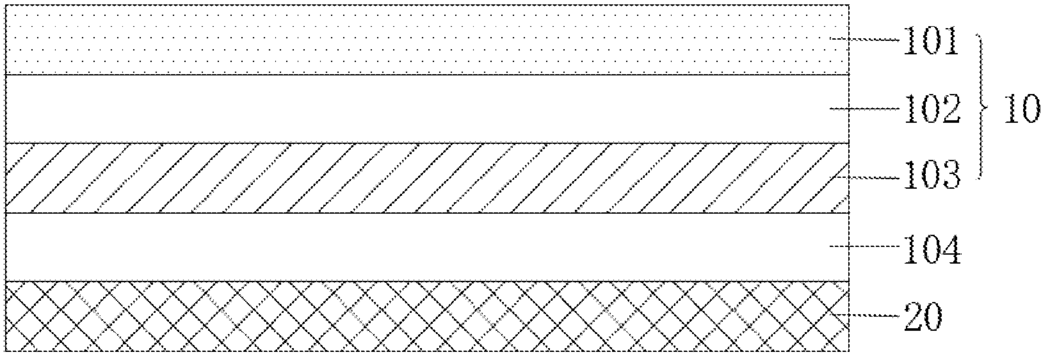
FIG. 2 shows a schematic diagram of a stacking structure of a light emitting module according to an embodiment of the present disclosure.

Specifically, referring to FIG. 2, the flexible light emitting panel 10 includes a substrate 101, a light emitting layer 102 and a packaging layer 103. The light emitting layer 102 is disposed at one side of the substrate 101, the packaging layer 103 is disposed at the side of the light emitting layer 102 away from the substrate 101, and the packaging layer 103 is closest to the support 20. It can be understood that, in the present disclosure, the flexible light emitting panel 10 is of a bottom-emission structure, and in some alternative embodiments, the flexible light emitting panel 10 may also be of a top-emission structure, which is not discussed further herein. In addition, in the present disclosure, the material of the substrate 101 is a flexible material, for example, polyimide (PI) and polyethylene terephthalate (PET).

The packaging layer 103 employs the technique of Thin-Film Encapsulation (TFE). Accordingly, both of the substrate 101 and the packaging layer 103 use a flexible material, and therefore the entire flexible light emitting panel 10 can change the shape according to demands, to satisfy the designs of different shapes of the car lamp. The packaging layer 103 may be connected to the support 20 by a first connecting adhesive layer 104, and the first connecting adhesive layer 104 may be selected from a hot melt adhesive and so on. Furthermore, when the technique of thin-film encapsulation is employed, the packaging layer 103, besides the TFE layer, may further include a metal-foil layer. The metal-foil layer is disposed between the TFE layer and the support, and the metal-foil layer may be an aluminum foil or a copper foil. The TFE layer and the metal-foil layer may be connected by a pressure-sensitive adhesive.

The light emitting layer 102 may include an anode layer, an electron injection layer, a luminescent-material layer, a hole transporting layer, a cathode layer, and so on, that are arranged in layer configuration, to realize the light emission demands of the flexible light emitting panel 10.

Further, referring to FIG. 1, the support 20 is disposed at the shadow side of the flexible light emitting panel 10. It should be noted that the side of the flexible light emitting panel 10 that emits the light rays is the light emitting side, and the shadow side refers to the side away from the light emitting side of the flexible light emitting panel 10. Furthermore, the surface of the side of the support 20 close to the flexible light emitting panel 10 includes a plurality of sub-surfaces 201, and the plurality of sub-surfaces 201 are sequentially connected to form an integral step-shaped structure.

In the present disclosure, referring to FIG. 1, the shape of the flexible light emitting panel 10 is a step shape. Accordingly, the shape of the support 20 is configured to be a step-shaped structure matching with the flexible light emitting panel 10, and the support 20 is integrally formed. The support 20 serves as a supporting and connecting part of the light emitting module, and the support 20 is mainly used to enable the light emitting module to be fixed to the corresponding position of the vehicle, so that the light emitting module can play a role in light-emission indication. The material of the support 20 may include an aluminum alloy, polymethyl methacrylate (PMMA), acrylonitrile-butadiene-styrene copolymer (ABS) and so on. Those materials have certain hardness and flexibility, and can match with the shape of the car lamp better.

It can be understood that, when the light emitting module according to the present disclosure is used as a car lamp, the quantity of the car lamp is merely one, and the quantity of the support 20 is also merely one. Therefore, in the present disclosure, the supports 20 for car lamps of different shapes are not required to be designed, which reduces the cost, and prevents interference between the supports 20 of the different car lamps.

It should be noted that, in the present disclosure, because the shape of the flexible light emitting panel 10 is a step shape, the shape of the support 20 is also a step shape. However, if the shape of the flexible light emitting panel 10 is another shape, for example, a wave shape, the support 20 may also be configured to be an adaptive wave shape. The shapes of the flexible light emitting panel 10 and the support 20 may be configured by a person skilled in the art according to demands, and thus are not discussed further in the present disclosure.

Figure 6:
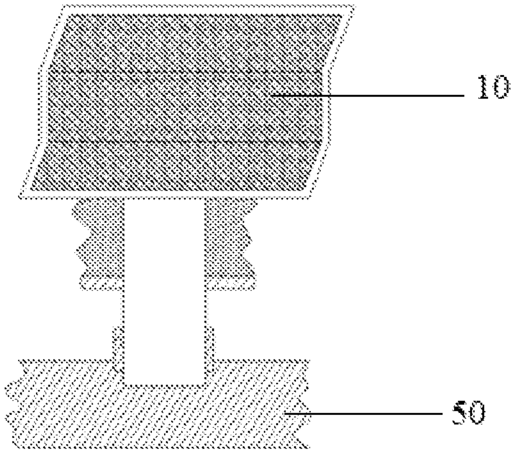
FIG. 6 shows a schematic structural diagram of a front face of a light emitting module applied to a car lamp according to an embodiment of the present disclosure.
Figure 7:
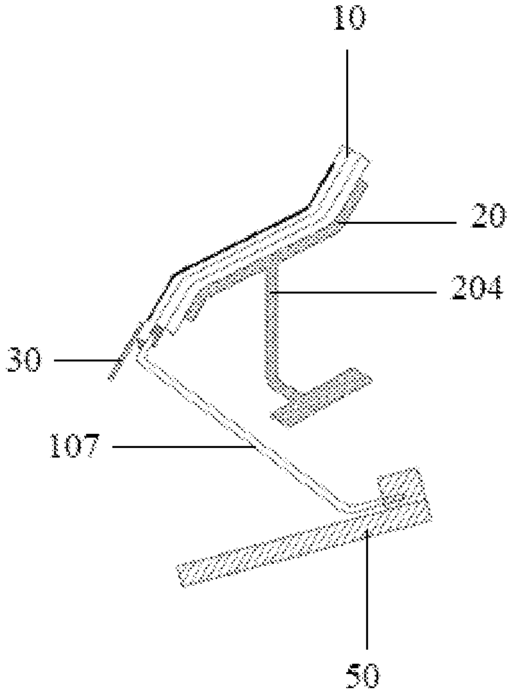
FIG. 7 shows a schematic structural diagram of a side face of a light emitting module applied to a car lamp according to an embodiment of the present disclosure.

Referring to FIGS. 6 and 7, when the light emitting module according to the present disclosure is applied to a car lamp, the support 20 may further include a supporting section 204. The supporting section 204 is connected to the related modules of the vehicle, to support the entire light emitting module. Additionally, the supporting section 204 and the support 20 may be manufactured by a mode of integral formation.

In an alternative embodiment, a light emitting module is provided by the present disclosure. Referring to FIG. 1, in the light emitting module, the quantity of the steps included by the step-shaped structure is greater than or equal to 3.

Particularly, referring to FIG. 1, the support 20 includes a plurality of sub-surfaces 201 that are sequentially connected, and two neighboring sub-surfaces 201 are connected to form one step of the step-shaped structure. In order to satisfy practical demands, in the present disclosure, the quantity of the steps is greater than or equal to 3. As an example, the quantity of the steps may be 3, 4, 5 and so on, which may be configured by a person skilled in the art according to demands, and thus is not discussed further herein.

Further, the support 20 is of an integral step-shaped structure. The included angle of a single step of the step-shaped structure is a first included angle 2011, and the opening of the first included angle 2011 faces the side away from the flexible light emitting panel 10. The included angle between two neighboring single steps is a second included angle 2012, and the opening of the second included angle 2012 faces the side where the flexible light emitting panel 10 is located. Additionally, in the step-shaped structure, the first included angle 2011 and the second included angle 2012 are alternately arranged. In other words, after a first included angle 2011 appears, it is sequentially connected to a second included angle 2012, followed by again being connected to the first corner 2011, and this process is repeated, till the entire support 20 of the step-shaped structure is formed.

In the present embodiment, an angle of the first included angle 2011 is greater than 180 degrees, and less than 270 degrees. As an example, the angle of the first included angle 2012 may be 210 degrees, 240 degrees, 260 degrees and so on. An angle of the second included angle 2012 is greater than 90 degrees, and less than 180 degrees. As an example, the angle of the second included angle 2012 may be 100 degrees, 120 degrees, 150 degrees and so on. It can be understood that a sum of the angle of the first included angle 2011 and the angle of the second included angle 2012 is always equal to 360 degrees.

Furthermore, the flexible light emitting panel 10 also has a plurality of step sections of equal angles. In addition, the flexible light emitting panel 10 further includes a starting section and an ending section, wherein the starting section is connected to the first step section, and the ending section is connected to the last one step section.

Figure 3:
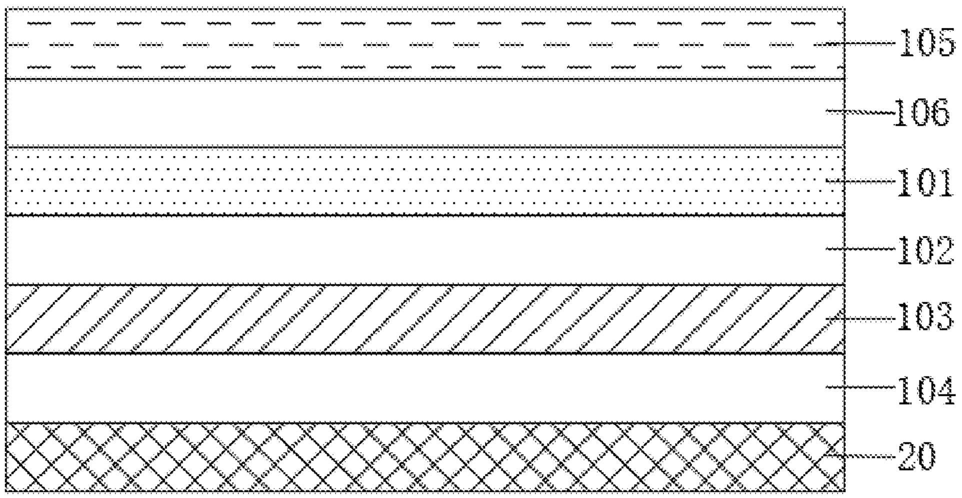
FIG. 3 shows a schematic diagram of a stacking structure of a light emitting module including a light filtering film according to an embodiment of the present disclosure.

In an alternative embodiment, a light emitting module is further provided by the present disclosure. Referring to FIG. 3, in the light emitting module, the flexible light emitting panel 10 further includes a light filtering film 105, and the light filtering film 105 is disposed at the side of the substrate 101 away from the light emitting layer 102.

Particularly, the light filtering film 105 and the substrate 101 may be connected by a second connecting adhesive layer 106. The second connecting adhesive layer 106 may include an optically clear adhesive (OCA), a pressure-sensitive adhesive (PSA) and so on. The light filtering film 105 can filter ultraviolet lights for the flexible light emitting panel 10, thereby the life of the luminescent material of the light emitting layer 102 is increased, and the numerical values of the chromaticity coordinate is increased, to improve the effect of displaying of the flexible light emitting panel 10. When applied to a car lamp, the light filtering film 105 can match with the colors of the entire vehicle and the lamp shell, to further improve the effect of displaying of the car lamp.

Figure 4:
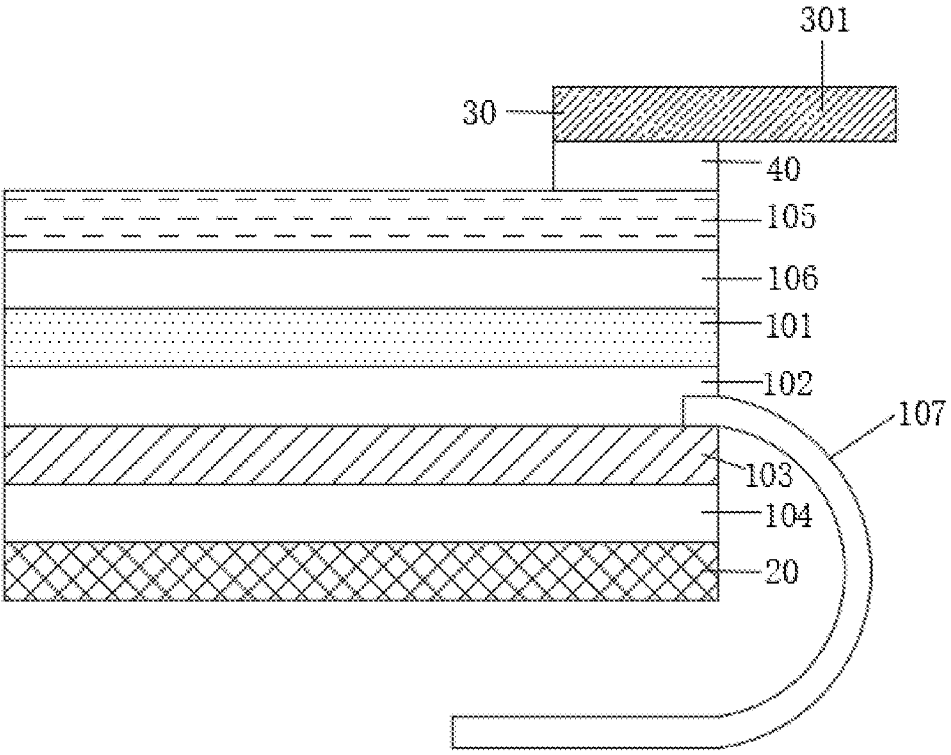
FIG. 4 shows a schematic diagram of a stacking structure of a light emitting module including a flexible circuit board and a decorating support according to an embodiment of the present disclosure.

Optionally, referring to FIG. 4, the flexible light emitting panel 10 further includes a flexible circuit board 107, one side of the flexible circuit board 107 is connected to the light emitting layer 102, and the other side is bent to the side of the support 20 away from the flexible light emitting panel 10.

Furthermore, referring to FIGS. 6 and 7, the light emitting module further includes a control panel 50, and the control panel 50 may be disposed at the related modules of the vehicle. The side of the flexible circuit board 107 that is further from the light emitting layer 102 is connected to the control panel 50, so that the control panel 50 is connected to the light emitting layer 102, to realize the light emission of the flexible light emitting panel 10.

However, because the flexible circuit board 107 is required to be bent to the side of the support 20 away from the flexible light emitting panel 10, in the related art, because the bent part of the flexible circuit board 107 is located outside the light emitting module, it is usually exposed outside the light emitting module, which affects the effect of the light emission of the light emitting module.

In an alternative embodiment, in order to solve the hiding problem of the flexible circuit board 107, referring to FIG. 4, a light emitting module is further provided by the present disclosure, wherein the light emitting module further includes a decorating support 30.

Specifically, the decorating support 30 is disposed at the side of the flexible light emitting panel 10 away from the support 20. Furthermore, the decorating support 30 includes an extending section 301, and the orthographic projection of the extending section 301 on the support 20 does not overlap with the orthographic projection of the flexible light emitting panel 10 on the support 20. In other words, the extending section 301, relative to the entire light emitting module, is located outside the light emitting module, which may also be understood as that the extending section 301 is the part that extends out of the light emitting module. The material of the decorating support 30 may be selected from an injection-molded piece having a metallic luster.

Further, referring to FIG. 4, in a first direction, the bending length of the flexible circuit board 107 is less than the length of the extending section 301. The bending length of the flexible circuit board 107 refers to the length in the first direction of the part of the flexible circuit board 107, after being bent, that goes beyond the flexible light emitting panel 10. Moreover, the first direction refers to the direction parallel to the surface of the support 20. Accordingly, the decorating support 30 can be utilized to block the bent part of the flexible circuit board 107, thereby the bent part of the flexible circuit board 107 is prevented from exposing out of the light emitting module. Furthermore, when applied to a car lamp, the decorating support 30 facilitates to improve a suspending feeling of the car lamp in the entire vehicle.

Optionally, the decorating support 30 and the flexible light emitting panel 10 may be connected by using a third connecting adhesive layer 40, and the third connecting adhesive layer 40 may include a hot melt adhesive and so on. Additionally, the position of connection of the decorating support 3020 may include two cases.

Figure 5:
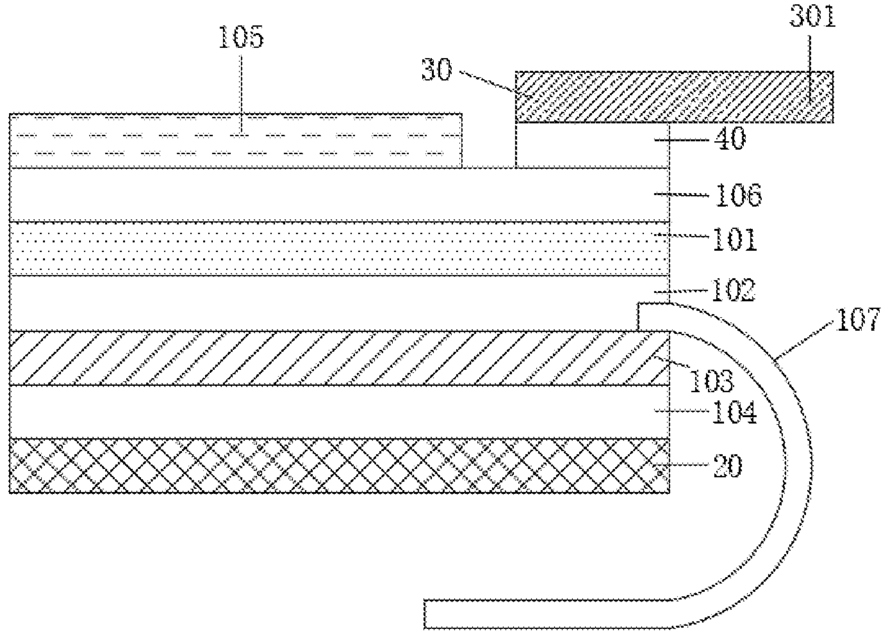
FIG. 5 shows a schematic diagram of a stacking structure of another light emitting module including a flexible circuit board and a decorating support according to an embodiment of the present disclosure.

Referring to FIG. 4, when the light filtering film 105 completely covers the substrate 101, the decorating support 30 may be located at the side of the light filtering film 105 away from the substrate 101, and be connected to the light filtering film 105. Referring to FIG. 5, when the light filtering film 105 does not completely cover the substrate 101, the decorating support 30 may also be located at the side of the substrate 101 not covered by the light filtering film 105 away from the light emitting layer 102; in other words, in this case the decorating support 30 is directly connected to the light emitting layer 102. The position of the decorating support 30 may be decided by a person skilled in the art according to practical demands, and is not discussed further herein in the present disclosure.

Figure 8:
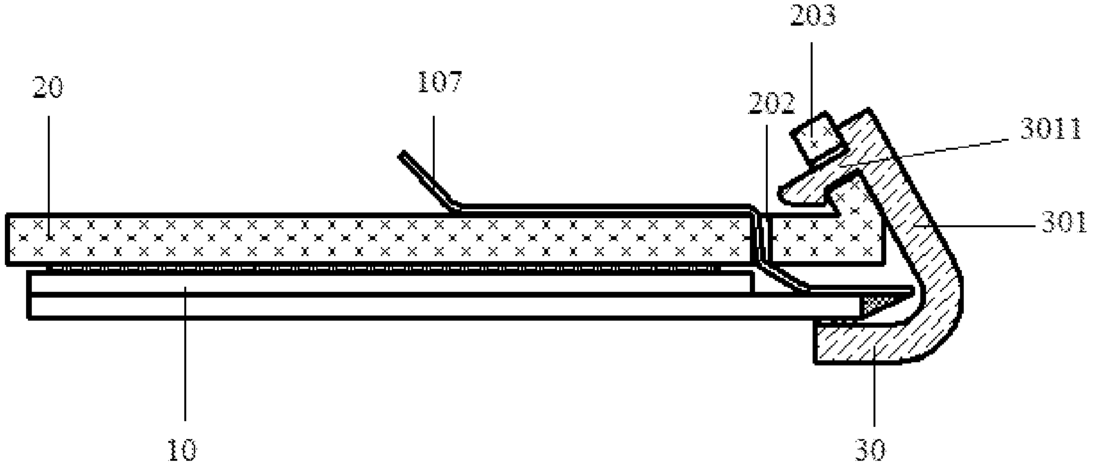
FIG. 8 shows a schematic structural diagram of a light emitting module having a decorating support having a bent extending section according to an embodiment of the present disclosure.

In an alternative embodiment, a light emitting module is further provided by the present disclosure. Referring to FIG. 8, in the light emitting module, the extending section 301 of the decorating support 30 is bent to the side of the support 20 away from the flexible light emitting panel 10.

Specifically, in the present embodiment, the support 20 further includes a fitting part 203. The position of the fitting part 203 corresponds to the position of the extending section 301 after being bent, and the fitting part 203 is provided with a fitting hole. After the decorating support 30 is connected to the light emitting module, the extending section 301 adheres to the fitting part 203; in other words, the extending section 301 after being bent directly contacts the fitting part 203. Furthermore, the extending section 301 is provided with a snap-fitting part 3011, and the shape of the snap-fitting part 3011 may be a bent-hook shape. Therefore, after the snap-fitting part 3011 has passed through the fitting hole of the fitting part 203, the extending section 301 and the fitting part 203 may be stuck, thereby the fixed connection of the decorating support 30 and the support 20 is realized.

Accordingly, the decorating support 30 can be connected to the support 20 better, thereby falling of the decorating support 30 is avoided. Additionally, when the flexible circuit board 107 has a relatively high length, the extending section 301 according to the present embodiment can block the bent part of the flexible circuit board 107 better.

Optionally, in the present embodiment, referring to FIG. 8, the support 20 is further provided with a via hole 202 extending throughout the support 20, and the flexible circuit board 107, after being bent, passes through the via hole 202.

Specifically, the flexible circuit board 107, after being bent, firstly passes through the via hole 202 in the support 20, and is subsequently connected to the control panel 50. Accordingly, in an aspect, the flexible circuit board 107 can be fixed to the light emitting module better, to prevent damage on the flexible circuit board 107. In another aspect, it can be prevented that the bent part of the flexible circuit board 107 has an excessively high length, so that the flexible circuit board 107 can be hidden better.

On the basis of the same inventive concept, a car lamp is further provided by the present disclosure, wherein the car lamp includes any one of the light emitting modules described above.

The “one embodiment”, “an embodiment” or “one or more embodiments” as used herein means that particular features, structures or characteristics described with reference to an embodiment are included in at least one embodiment of the present disclosure. Moreover, it should be noted that here an example using the wording “in an embodiment” does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word “include” does not exclude elements or steps that are not listed in the claims. The word “a” or “an” preceding an element does not exclude the existing of a plurality of such elements. The present disclosure may be implemented by means of hardware including several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A light emitting module, comprising a flexible light emitting panel and a support disposed at a shadow side of the flexible light emitting panel, wherein a surface of one side of the support close to the flexible light emitting panel comprises a plurality of sub-surfaces, and the plurality of sub-surfaces are sequentially connected to form an integral step-shaped structure, wherein the flexible light emitting panel comprises:

a substrate, a light emitting layer disposed at one side of the substrate and a packaging layer disposed at one side of the light emitting layer away from the substrate, wherein the packaging layer is closest to the support;

a light filtering film disposed at one side of the substrate away from the light emitting layer; and a flexible circuit board, wherein one side of the flexible circuit board is connected to the light emitting layer, and the other side of the flexible circuit board is bent to one side of the support away from the flexible light emitting panel, and wherein the light emitting module further comprises a decorating support disposed at one side of the flexible light emitting panel away from the support, and the decorating support comprises an extending section, and an orthographic projection of the extending section on the support does not overlap with an orthographic projection of the flexible light emitting panel on the support.

2. The light emitting module according to claim 1, wherein a quantity of steps comprised by the step-shaped structure is greater than or equal to 3.

3. The light emitting module according to claim 2, wherein a material of the support comprises at least one of an aluminum alloy, polymethyl methacrylate and acrylonitrile-butadiene-styrene copolymer.

4. The light emitting module according to claim 1, wherein two neighboring sub-surfaces are connected to form a single step of the step-shaped structure, an included angle of the single step is a first included angle, and an included angle between two neighboring single steps is a second included angle;

an opening of the first included angle faces one side away from the flexible light emitting panel, an opening of the second included angle faces one side where the flexible light emitting panel is located, and the first included angle and the second included angle are alternately arranged;

wherein an angle of the first included angle is greater than 180 degrees, and less than 270 degrees; and an angle of the second included angle is greater than 90 degrees, and less than 180 degrees.

5. The light emitting module according to claim 4, wherein a material of the support comprises at least one of an aluminum alloy, polymethyl methacrylate and acrylonitrile-butadiene-styrene copolymer.

6. The light emitting module according to claim 1, wherein a bending length of the flexible circuit board is less than a length in a first direction of the extending section;

wherein the bending length refers to a length in the first direction of a part of the flexible circuit board that goes beyond the flexible light emitting panel; and the first direction refers to a direction parallel to a surface of the support.

7. The light emitting module according to claim 6, wherein the light emitting module further comprises:

a control panel, wherein one side of the flexible circuit board that is further from the light emitting layer is connected to the control panel.

8. The light emitting module according to claim 1, wherein the light filtering film completely covers the substrate, and the decorating support is located at one side of the light filtering film away from the substrate.

9. The light emitting module according to claim 8, wherein the light emitting module further comprises:

a control panel, wherein one side of the flexible circuit board that is further from the light emitting layer is connected to the control panel.

10. The light emitting module according to claim 1, wherein the light filtering film partially covers the substrate, and the decorating support is located at one side of the substrate not covered by the light filtering film away from the light emitting layer.

11. The light emitting module according to claim 1, wherein the extending section is bent to the one side of the support away from the flexible light emitting panel;

the support comprises a fitting part, the fitting part is provided with a fitting hole, and the extending section, after bent, adheres to the fitting part; and the extending section is provided with a snap-fitting part, and the snap-fitting part passes through the fitting hole, whereby the extending section is stuck with the fitting part.

12. The light emitting module according to claim 1, wherein the support is provided with a via hole, and the flexible circuit board, after bent, passes through the via hole.

13. The light emitting module according to claim 1, wherein the light emitting module further comprises:

a control panel, wherein one side of the flexible circuit board that is further from the light emitting layer is connected to the control panel.

14. The light emitting module according to claim 1, wherein a material of the support comprises at least one of an aluminum alloy, polymethyl methacrylate and acrylonitrile-butadiene-styrene copolymer.

15. A car lamp, wherein the car lamp comprises the light emitting module according to claim 1.

* * * * *